Aug. 30, 1938.　　　R. E. BRIGGS　　　2,128,345
MATERIAL HANDLING APPARATUS
Filed Dec. 8, 1933　　　14 Sheets-Sheet 5
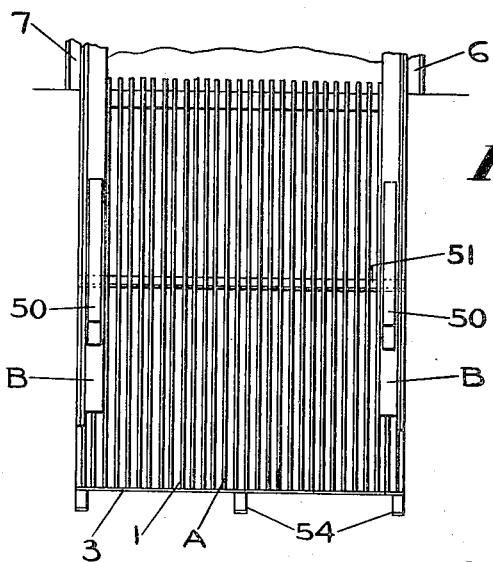
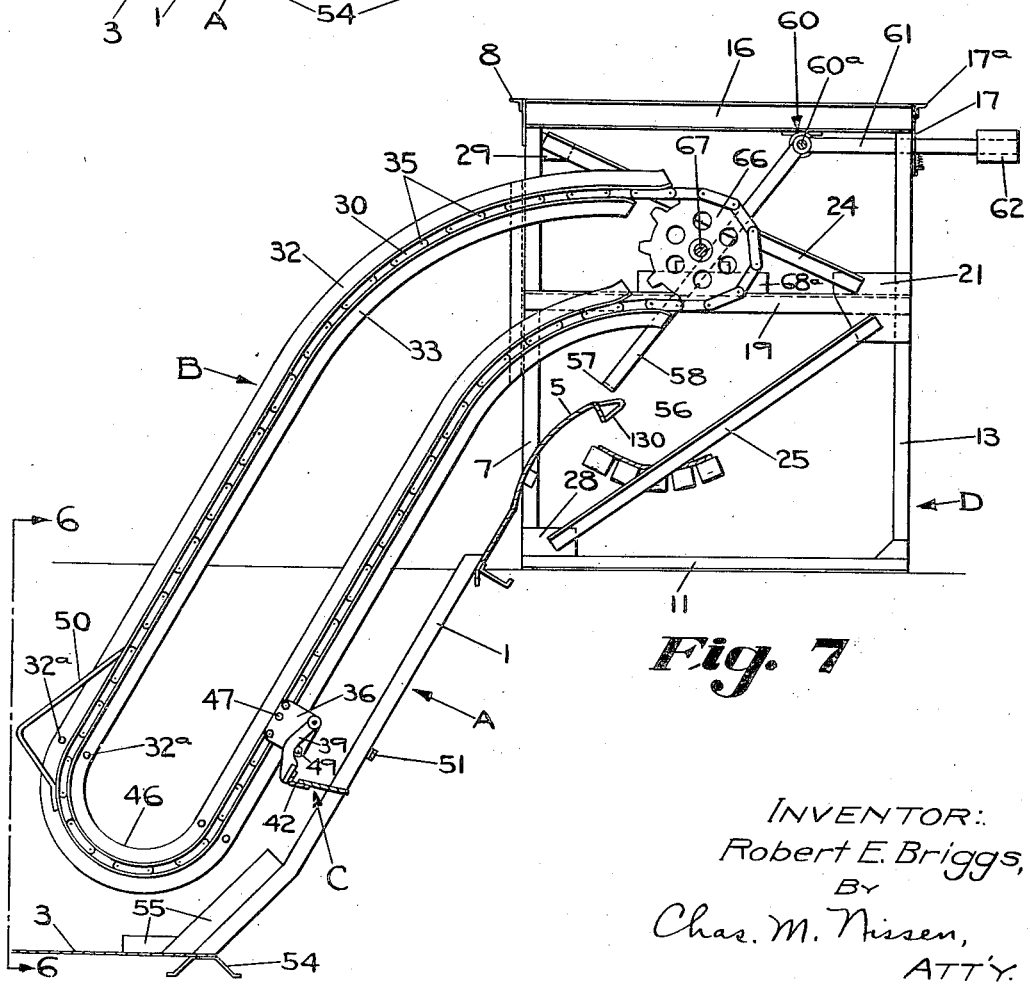
INVENTOR:
Robert E. Briggs,
BY
Chas. M. Nissen,
ATTY.

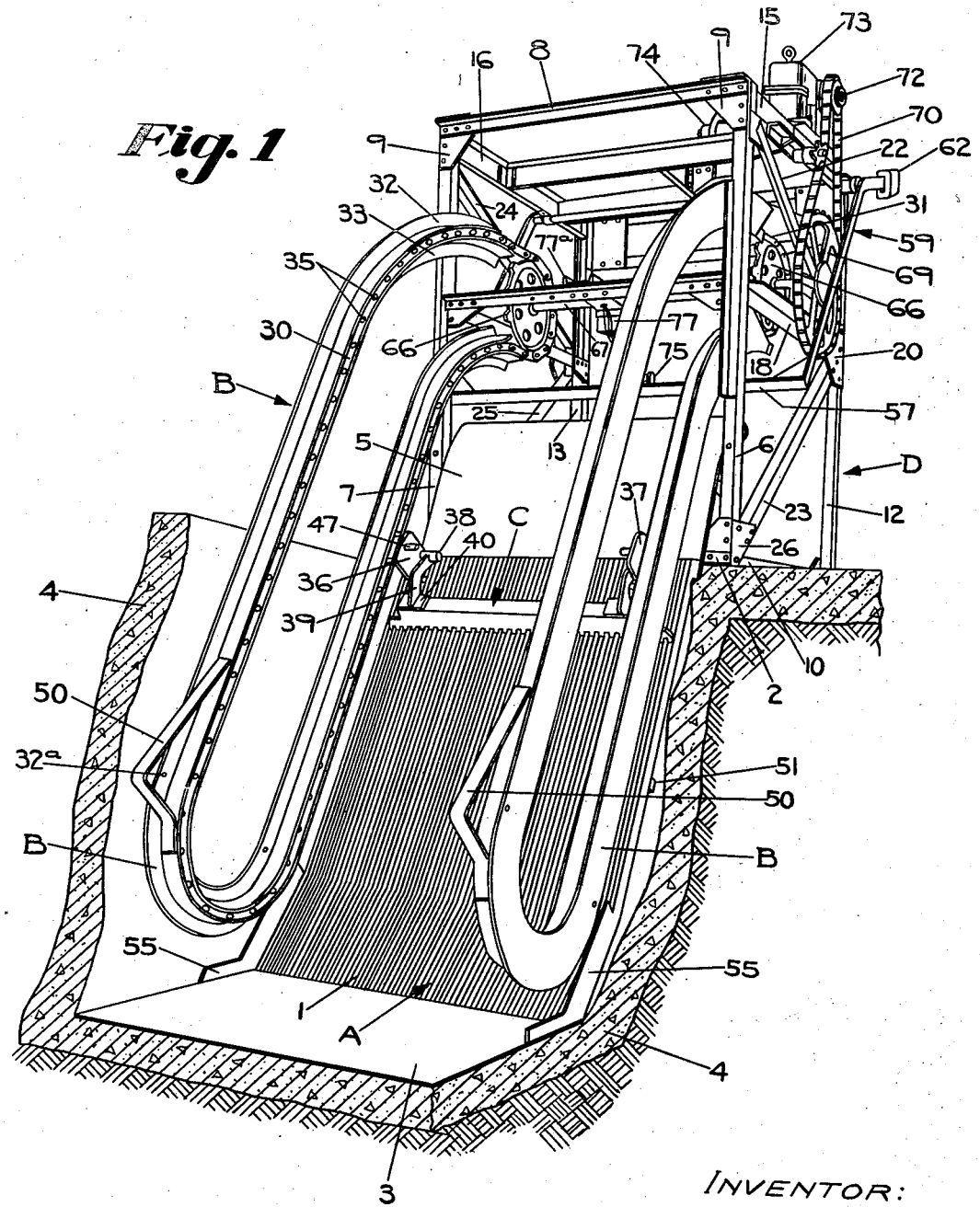

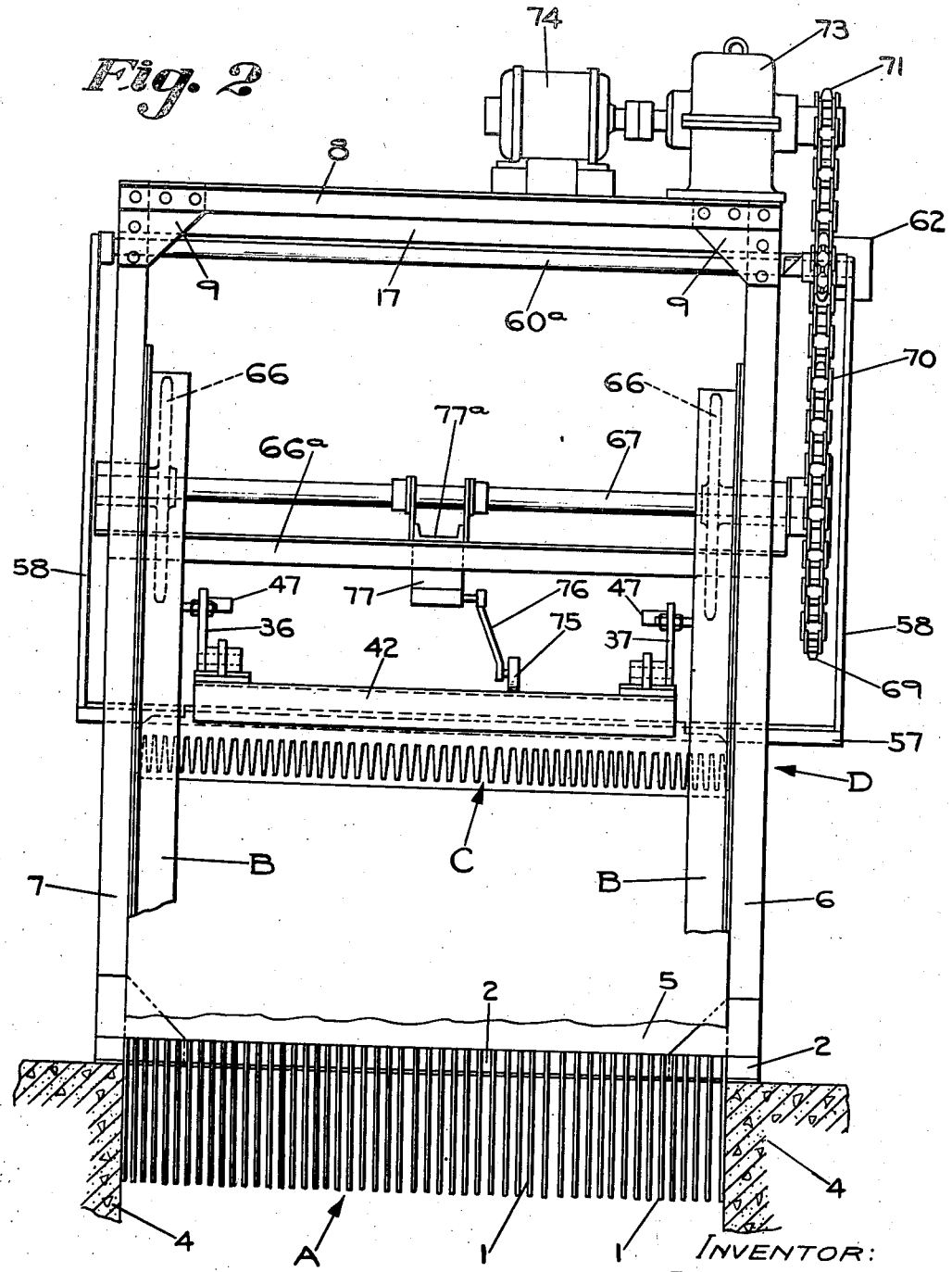

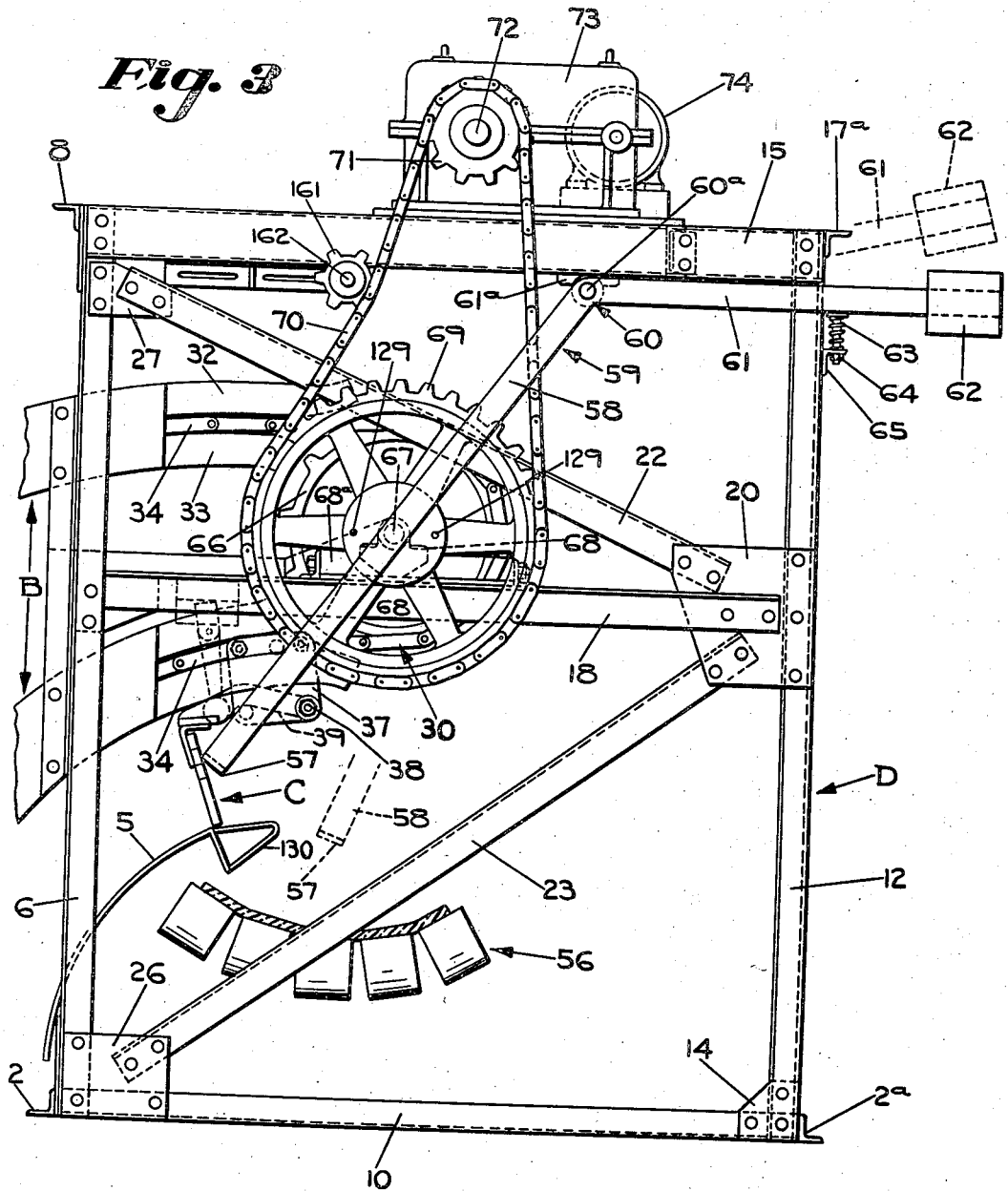

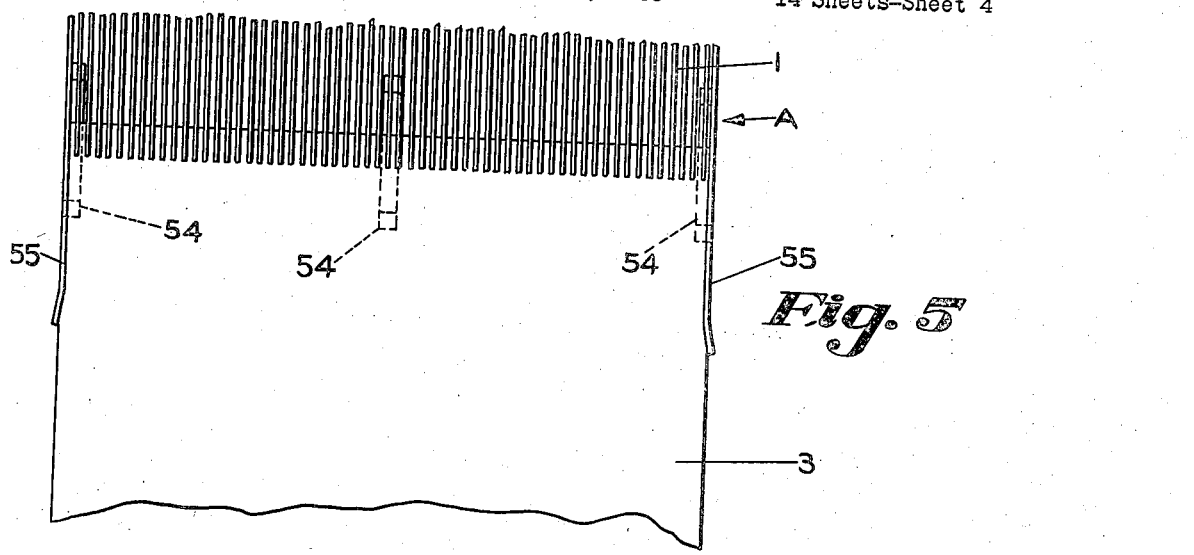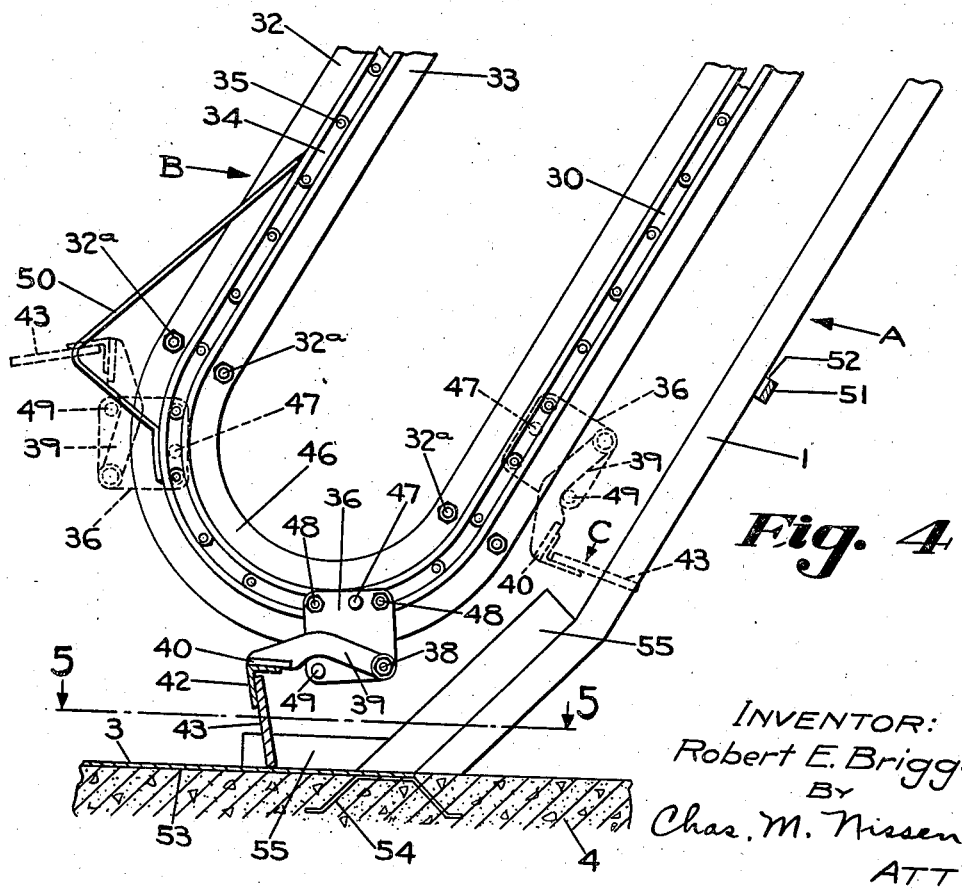

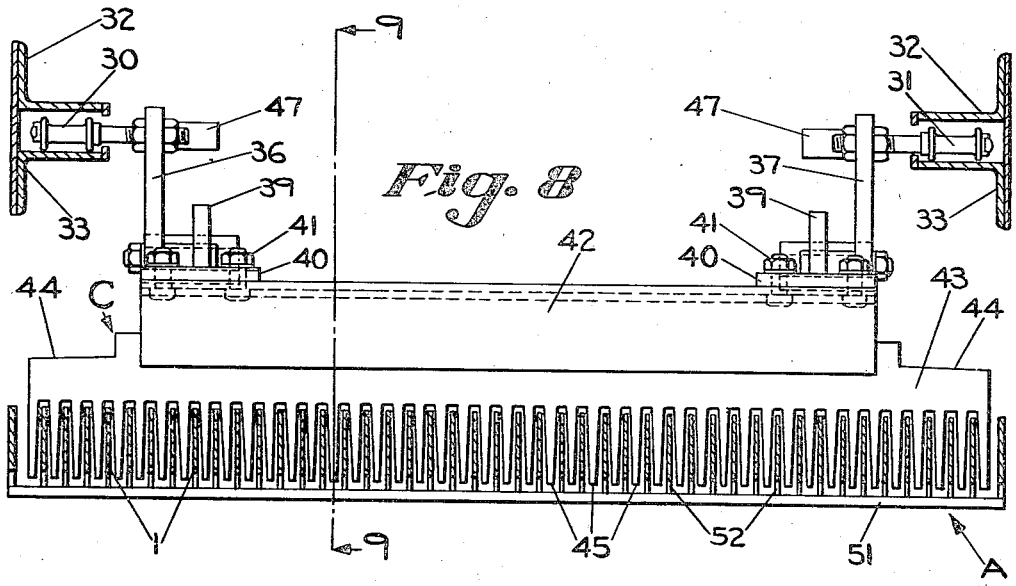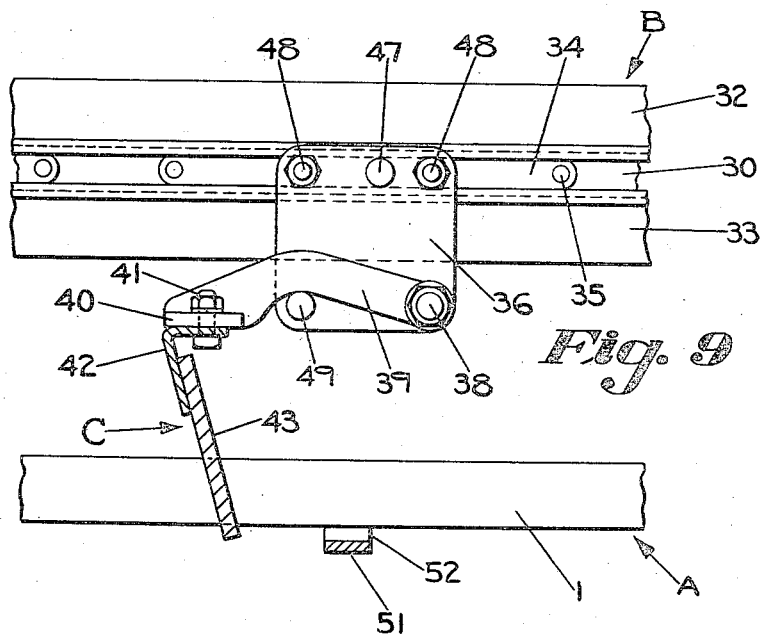

Aug. 30, 1938.    R. E. BRIGGS    2,128,345
MATERIAL HANDLING APPARATUS
Filed Dec. 8, 1933    14 Sheets-Sheet 7
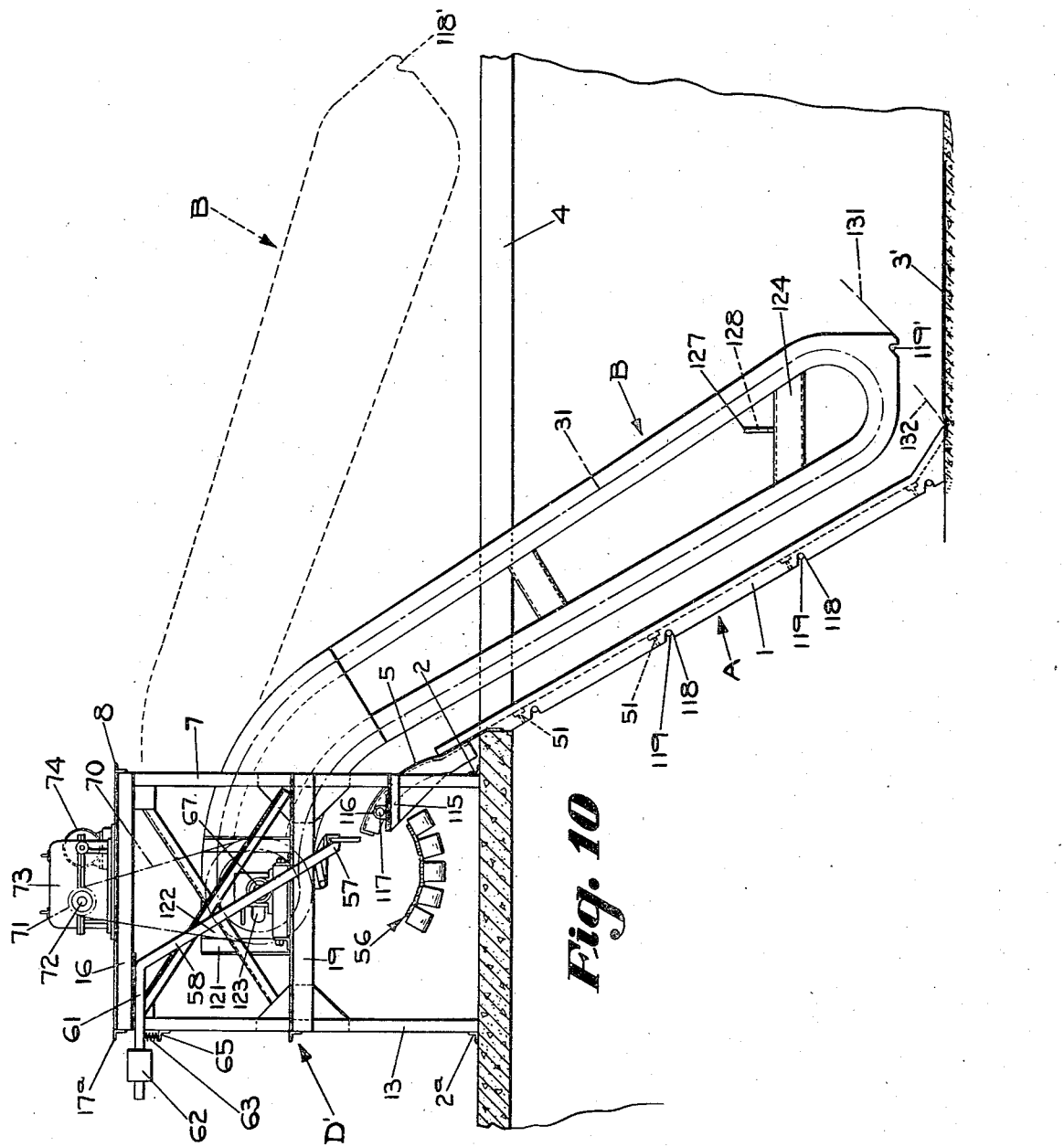
INVENTOR:
Robert E. Briggs,
BY
Chas. M. Nissen
ATT'Y.

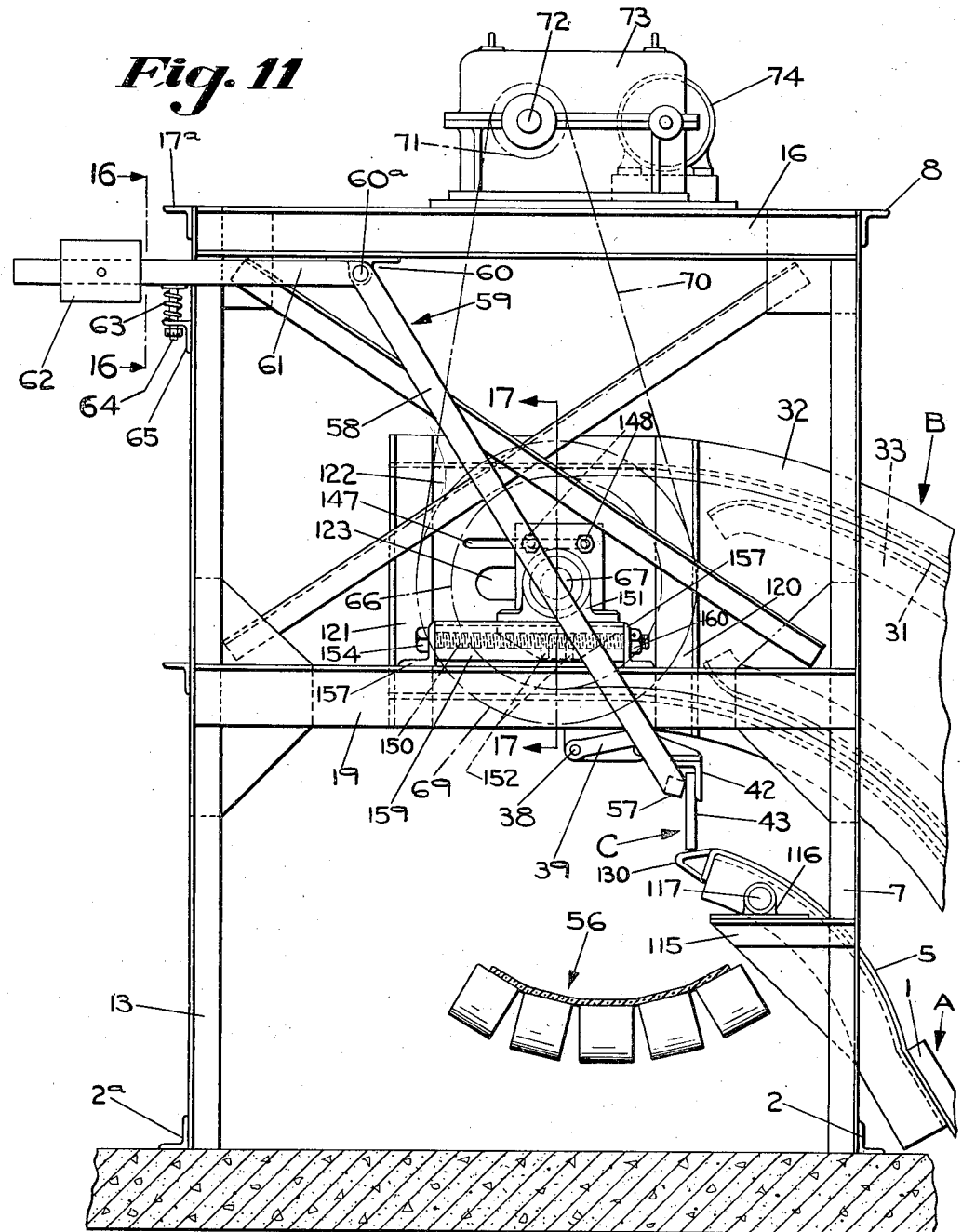

Aug. 30, 1938.  R. E. BRIGGS  2,128,345
MATERIAL HANDLING APPARATUS
Filed Dec. 8, 1933   14 Sheets-Sheet 9

INVENTOR:
Robert E. Briggs,
By
Chas. M. Nissen,
ATTY.

Aug. 30, 1938.   R. E. BRIGGS   2,128,345
MATERIAL HANDLING APPARATUS
Filed Dec. 8, 1933   14 Sheets-Sheet 10

INVENTOR:
Robert E. Briggs,
BY
Chas. M. Niesen,
ATT'Y

Aug. 30, 1938.      R. E. BRIGGS      2,128,345
MATERIAL HANDLING APPARATUS
Filed Dec. 8, 1933      14 Sheets-Sheet 11

INVENTOR:
Robert E. Briggs,
BY
Chas. M. Nissen,
ATTY.

Aug. 30, 1938.  R. E. BRIGGS  2,128,345
MATERIAL HANDLING APPARATUS
Filed Dec. 8, 1933  14 Sheets-Sheet 12
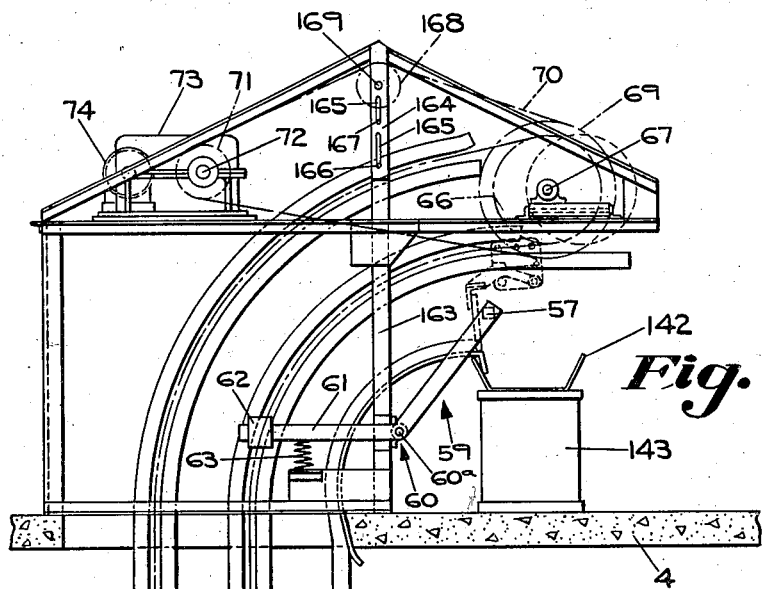
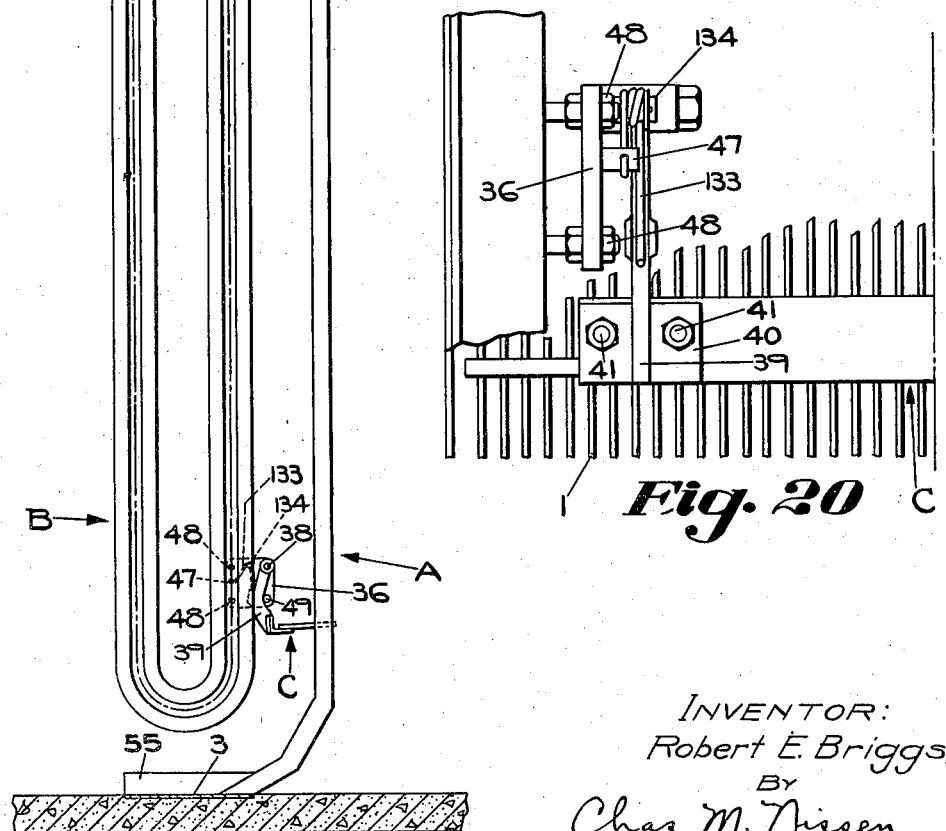
INVENTOR:
Robert E. Briggs,
BY
Chas. M. Nissen,
ATTY.

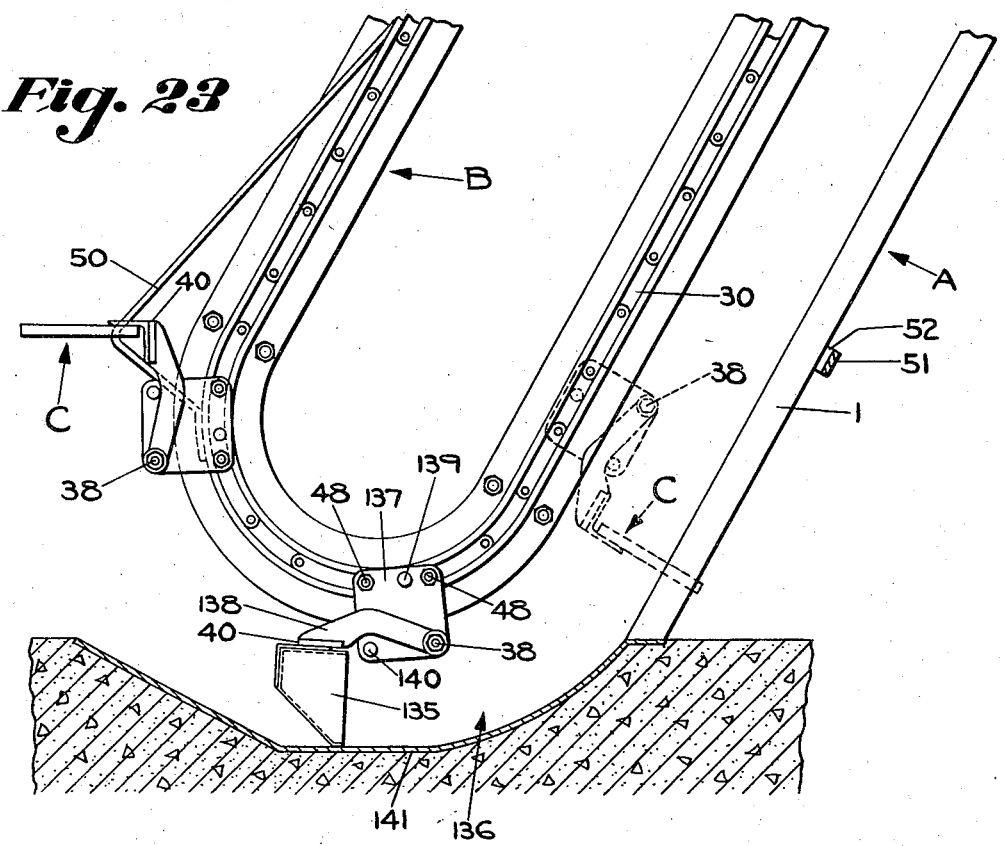
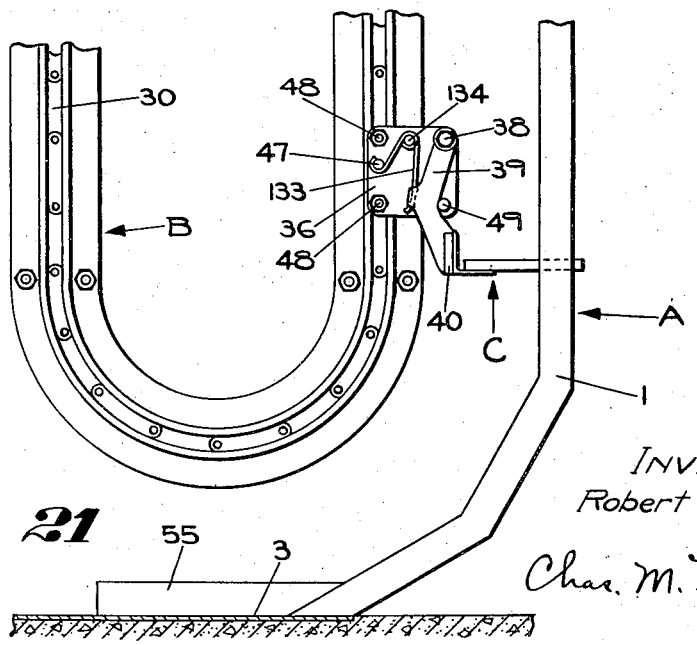

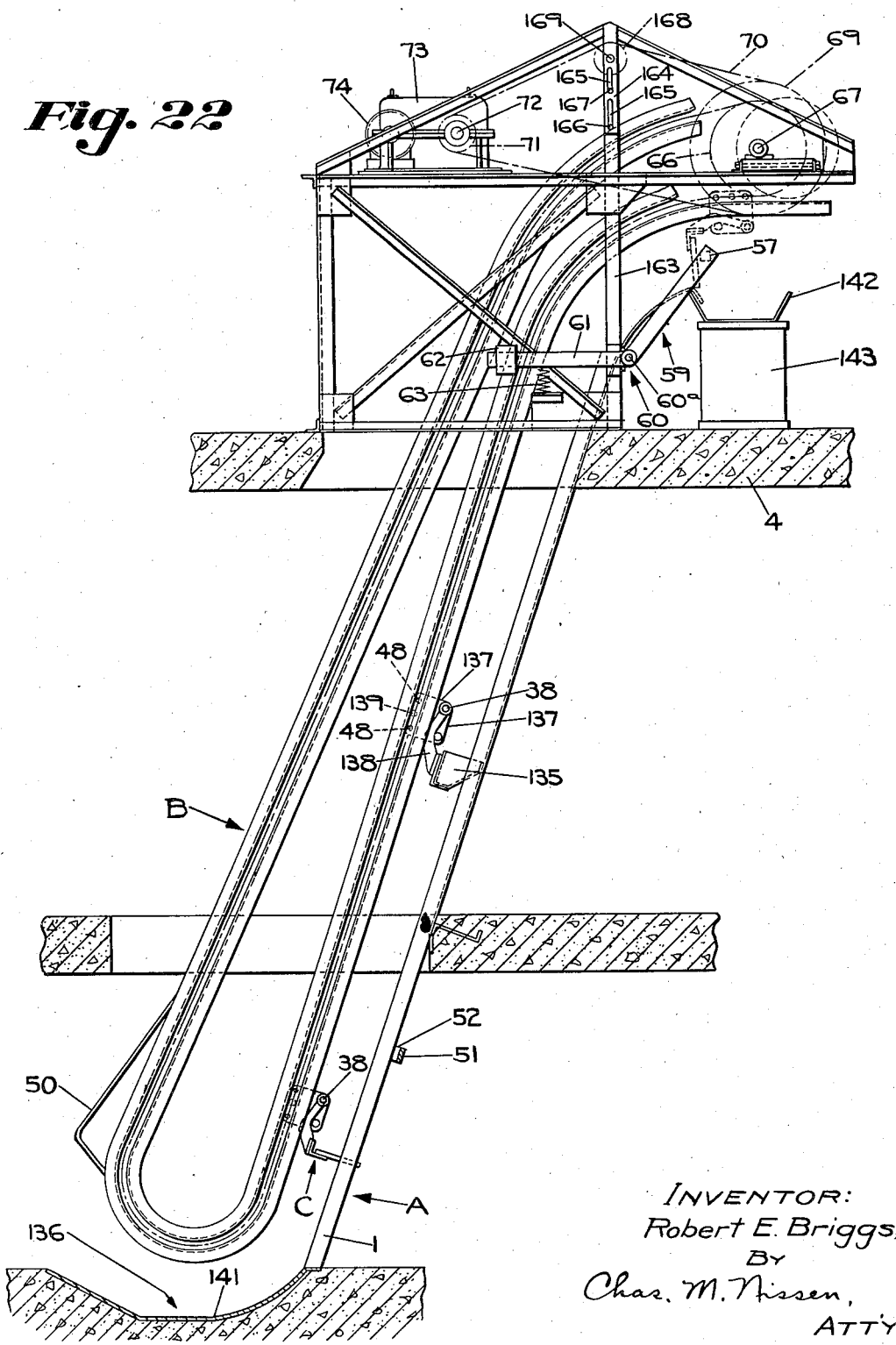

Patented Aug. 30, 1938

2,128,345

UNITED STATES PATENT OFFICE 2,128,345

MATERIAL HANDLING APPARATUS

Robert E. Briggs, Columbus, Ohio, assignor to The Jeffrey Manufacturing Company, a corporation of Ohio Application December 8, 1933, Serial No. 701,548

21 Claims. (Cl. 210—176)

With the growth of urban population and a developing public consciousness of sanitary requirements, the value of sanitary engineers in handling adequately and effectively sewage disposal problems is receiving deserved recognition; and while the science of the chemist and bacteriologist has played and continues to play an important part in sanitation, nevertheless, with sewage treatment plants called upon to handle millions of gallons of material daily, the enormity of the task directs attention increasingly toward adoption of mechanical handling methods.

In line with these considerations, the present invention provides an apparatus of the nature of a self-cleaning bar screen which is designed with the primary purpose of removing solid refuse and trash from a stream of sewage or the like as the latter is passing to the usual settling tanks, so as to effect removal of such solid material preliminary to the settling operation; but while the apparatus is intended with the primary view of use in connection with sewage disposal operations, it will be apparent that it may be employed in any operations requiring the screening of solid materials from an accompanying body of liquid.

Among the objects of the present invention there may be mentioned specifically that the invention provides a self-cleaning bar screen which provides a clear opening from side to side of the submerged portion, there being eliminated all cross members within the channel to act as obstructions.

A further object of the invention is to provide a self-cleaning bar screen in which there are no sprockets or shafts at the bottom of the channel to require attention, the conveyor chain employed in the apparatus being guided around large radius curves for the return travel of the chain.

A still further object is to provide a hinged rake or scraper for preventing jamming of the mechanism from accumulation of foreign material in the bottom of the channel or upon the screen.

A still further object of the invention is to provide means for gently turning the rake or scraper from inoperative position into operative position, thereby avoiding unnecessary shocks or jars to the mechanism.

A still further object of the invention is to provide a self-cleaning bar screen having return runways for the rake disposed at a considerable distance from the screen, so that the rake or scraper enters the sewage back of the accumulated refuse and collects any accumulation in front of the screen, coming up under the refuse in suspension.

A still further object of the invention is to provide a rake or scraper having teeth which pass entirely through the screen, thereby cleaning not only the surface but also the spaces between the bars, the rake being arranged to pull obstructions out of the screen instead of pushing them through.

A still further object of the invention is to provide wiping mechanism for engaging the rake or scraper after the latter has discharged its load, so that the rake will be freed of any material adhering to it, the wiper being provided with means for automatically returning it to position.

A still further object is to provide control mechanism for operating the rake, the said mechanism including means engageable by the rake for stopping the operation of the apparatus responsively to the rake reaching the upper limit of its return travel, and mechanism for automatically re-starting the apparatus after a predetermined time interval, instrumentalities being also provided for operating the control mechanism continuously as well as at predetermined intervals.

A still further object of the invention is to provide means for releasing the mechanism without damage, should some unusual obstruction be encountered.

The invention is exemplified in the combination and arrangement of parts shown in the accompanying drawings, and described in the following specification, and it is more particularly pointed out in the appended claims.

In the drawings:

Fig. 1 is a perspective view of one form of apparatus embodying the principles of the present invention;

Fig. 2 is a fragmentary front elevation of the upper part of the apparatus, the view showing the driving mechanism therefor;

Fig. 3 is a side elevation of the parts shown in Fig. 2;

Fig. 4 is a fragmentary sectional elevation showing the lower part of the screen and track for the conveyor chain, the mounting of the rake or scraper upon the chain, and means for easing the rake from inoperative position into operative position, the rake or scraper being shown in section;

Fig. 5 is a plan view of the lower end of the screen, the chain and scraper mechanism of Fig. 4 being omitted, the view being taken on line 5—5 of Fig. 4;

Fig. 6 is a front elevation of the entire screen, including the tracks or guides for the conveyor chain carrying the rake or scraper, the view being taken looking in the direction of the arrows 6—6;

Fig. 7 is a sectional elevation through the entire apparatus, the view being along the longitudinal axis of the apparatus;

Fig. 8 is a transverse sectional view through the screen and conveyor tracks, the view showing the position of the rake or scraper relative to the screen when in operative position;

Fig. 9 is a sectional view on the line 9—9 of Fig. 8;

Fig. 10 is a view similar to Fig. 7, but showing a somewhat modified form of apparatus;

Fig. 11 is an enlarged side elevation of the upper part of the structure of Fig. 10, the view illustrating certain of the drive mechanism for the apparatus the view also showing, in transverse section, a conveying device for receiving and removing material discharged from the screen by the rake or scraper;

Fig. 19 is a side elevation of the apparatus installed in a vertical position;

Fig. 20 is a fragmentary plan view of the rake or scraper employed in the installation of Fig. 19, showing means provided for maintaining the rake or scraper in engagement with the vertically disposed bar screen;

Fig. 21 is a fragmentary side view of the mounting of the rake of Fig. 20;

Fig. 22 is a side elevation of the screen, illustrating the screen as being provided with a grit removing attachment;

Fig. 23 is a fragmentary side view of the lower end of the apparatus of Fig. 22, illustrating the grit remover in operative position.

Figure 12:
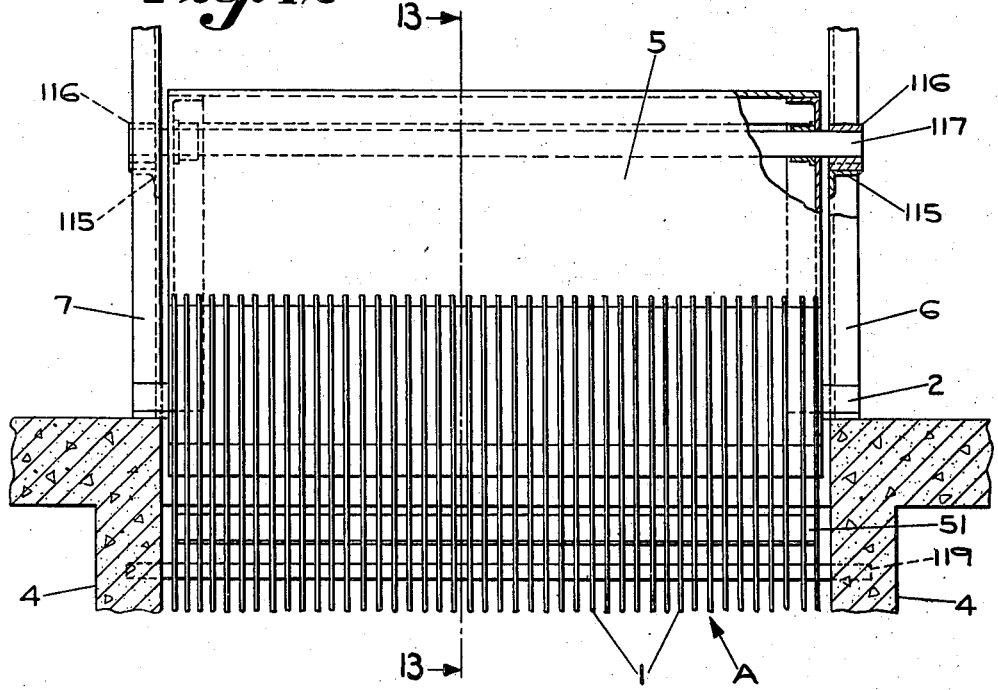
Fig. 12 is an elevational view, partly in section, of the screen of the apparatus of Fig. 10, showing details of mounting of the screen.
Figure 13:
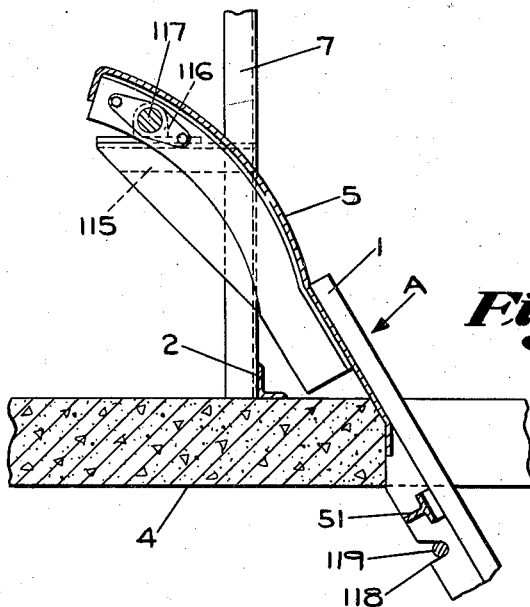
Fig. 13 is a section on line 13—13 of Fig. 12.

Referring more particularly to the drawings, the apparatus embraces essentially a screen A, adapted to be submerged in a tank or pit into which the liquid, such as sewage, to be screened is being passed, guide tracks B for the chains carrying the rake or scraper C, and the supporting framework D, which supports the upper part of the screen and guide tracks and also carries the drive mechanism for operating the chains and scraper. It will be observed that the screen comprises a plurality of spaced bars 1, equidistantly spaced relatively to the angle bar 2 and bottom plate 3, the plate 3 having the bars 1 welded thereto, and thus maintaining the bars 1 in proper spaced relation. The width of the screen A may be whatever is desired for any given installation, being sufficient to extend across the width of a tank or pit 4 in which the screen A is submerged. The upper ends of bars 1 terminate adjacent a curved plate 5 as will be apparent from Fig. 3, for example, and are welded thereto.

To the ends of angle bars 2 are secured upright angle standards 6 and 7, the upper ends of which are connected by the horizontal angle 8 and braced by plates 9, 9 riveted, bolted or welded to the upright and horizontal members. Also from each end of the angle 2 extending rearwardly thereof, are the horizontal angles 10 and 11, the ends of which are connected by an angle bar 2a corresponding to the angle 2. Upright angle bars 12 and 13 are secured to the bars 10 and 11, these bars corresponding to the bars 6 and 7 and are of equal length therewith, these bars 12 and 13 being braced by similar plates, one of which is indicated at 14.

The supporting framework D is completed by the horizontal bars 15, 16 and rear plate 17, the latter being secured to an angle bar 17a.

Extending horizontally between the vertical standards 6 and 12, and 7 and 13, are corresponding horizontal angle beams 18 and 19, suitably braced by plates 20 and 21 secured to the rear uprights 12 and 13. Diagonal braces 22, 23, 24 and 25 further strengthen the framework D, these braces being secured to the brace plates 20 and 21 and also to brace plates 26, 27, 28 and 29, as will be apparent from the drawings.

Positioned above the bars 1 of the screen A are the guide tracks B for the endless flexible chains 30 and 31 to which the scraper or rake C is secured as will be hereinafter set forth in greater detail. These tracks are each formed of upper and lower angles 32 and 33, between which the chains run, and are substantially doubled upon themselves in large radius curves to provide guides for both the forward and return runs of the chain. These tracks are carried by the supporting framework D, having their ends riveted or welded to the braces 18, 19, 22 and 24, respectively, and being anchored by bolts 32a to the sides of the pit 4.

The chains 30 and 31 are made up of links 34 pivotally interconnected by horizontal pivot pins 35 so that the chains will be freely flexible in a vertical direction. To corresponding links 34 of the chains 30 and 31 are bolted corresponding plates 36 and 37 to each of which plates is hingedly secured at 38, an arm 39, each of which arms is provided with a flange 40, to which plates is bolted as indicated by bolts 41, the angle member 42 which connects the arms 39. The scraper or rake C is welded to the angle member 42.

The rake C comprises a body 43, the ends of which are formed into shoulders 44 which engage the top angles 32 of the guide tracks B during the downward travel of the scraper. The scraper is provided with teeth 45 which are adapted to pass between the bars 1 of the screen when the rake assumes its operative position, the teeth 45 passing entirely through the screen A.

It will be noted from the drawings that the chains 30 and 31 travel around large radius curves 46 in their guide tracks for the return run of the chains. As the chains approach these curves, it will be seen that the teeth 45 of the rake C extend upwardly, the arms 39 resting upon pins 47 extending through the plates 36 intermediate the members 48 securing the plates to the chains. In order for the rake C to assume its operating position with its teeth 45 extending between the bars 1, it will be apparent that the arms 39 must swing through an arc of approximately 90°, or until they engage other pins 49 in the plates 36 which pins 49 are provided for supporting the rake in its operative position. Because of the substantial weight of the rake, the drop from the pins 47 to the pins 49 as the plates 36 move around the curves 46 would be violent were provisions not made for easing the rake into its operative position, thus avoiding the shocks incident to the drop between the pins 47 and 49.

Accordingly, on the upper angles 32 of the tracks B, there are fixed the cam members 50, 50, which are engaged by the shoulders 44, 44 of the rake or scraper C, and serve to ease the transposition of the arm 39 from the pins 47 to the pins 49, as aforesaid, the shoulders 44, 44, sliding along the cam surfaces of the members 50 in continuous engagement therewith as the rake assumes its operative position incident to the conveyor chains passing around the bends 46 of their tracks.

It will be understood that the screen A is installed in its pit or tank so that the flow of liquid is against the upper surface of the screen, the bars 1 thereof catching and retaining solid matter carried by the liquid current. It will be apparent that such solids will accumulate in front of the screen to a greater or less extent, depending upon the time intervals between the operation of the rake. It will be seen further that the curved portions 46 of the tracks project sufficiently far forwardly of the end of the screen to enable the rake C, as it turns into its operative position, to enter the liquid back of the accumulated solids, thereby collecting the accumulation in front of the screen, and coming up under the refuse in suspension; and since the teeth 45 of the rake extend entirely through the interstices between the bars 1, as the rake travels upwardly along the screen, it will pull any obstructions out of the screen instead of pushing them through.

In order to maintain the bars 1 in equi-spaced relation throughout their entire length during all operating conditions, one or more brace bars 51 may be provided extending transversely of the screen A, being welded to the extensions 52 of the bars 1, so that the brace bars 51 will be spaced sufficiently far below the screen to enable the teeth 45 to clear these brace bars.

To protect the bottom of the pit or tank in which the screen is installed from the scraping action of the rake and to maintain the bars 1 in proper spaced relation, the plate 3 is embedded in the concrete of the pit, as at 53, and anchored by means of anchor members 54. The solid refuse accumulates on this plate and the teeth 45 scrape the surface of the plate as it gathers the accumulation. Lateral guide plates 55 may be provided for guiding the rake upon the screen.

When the rake reaches the top of the screen A, it pushes the collected refuse onto the plate 5, whence the refuse is discharged on suitable conveying instrumentalities 56 for conveying it away to disposal. As the material discharges from the plate 5 onto conveyor 56 (Fig. 3), the rake engages wiping mechanism including a wiper 57 mounted on arms 58, 58 of bell cranks 59, 59 which are pivoted at their fulcrums 60, 60 to the shaft 60a extending past the standards or bars 15 and 16 of the framework D, the bars 15 and 16 being provided with bearings 61a, 61a in which shaft 60a turns. The arms 61, 61 of the bell cranks 59, 59 are provided with counter-weights 62, 62, and are resiliently cushioned on springs 63, 63 carried by bolts 64, 64 mounted on angle bar 65. Engagement of the rake with the wiper 57 depresses the arms 58, 58 of the bell cranks 59, 59, raising the arms 61, 61 as indicated by dotted lines in Fig. 3, for example. When the rake has passed over the wiper 57, the weights 62, 62, return the bell-cranks 59, 59 to their former position.

Coming now to a consideration of the drive mechanism for the chains 30 and 31, it will be observed that the chains are guided throughout substantially their entire length by the guide tracks B. These guides B terminate, however, just short of the sprockets 66, 66 connected by a head shaft 67 mounted in suitable bearings 68, 68 on take-up frames 68a, 68a mounted on the horizontal brace angles 18 and 19 of the framework D. The sprockets 66, 66 drive the chains 30 and 31, the shaft 67 being in turn operated by a drive sprocket 69 operated by a sprocket chain 70, driven by sprocket 71. Sprocket 71 is mounted on a drive shaft 72 of a standard type of speed reducer 73, operated in turn by a motor 74. As the rake clears the wiper, the body 42 of the rake engages a roller 75 (Fig. 2) mounted on an arm 76 of a limit switch 77 carried on the channel 77a supported at one end by the shaft 67, the other end of the channel being supported on the horizontal angle 66a, the limit switch 77 thereby being tripped and the motor 74, being controlled by the limit switch, is stopped until the circuit is re-made upon expiration of the period for which the timing means in circuit with the limit switch is set, when the motor 74 and drive mechanism for the rake will be re-started to resume operation of the rake. The limit switch is of standard type and the timing means may be conveniently a dash pot.

Figure 18:
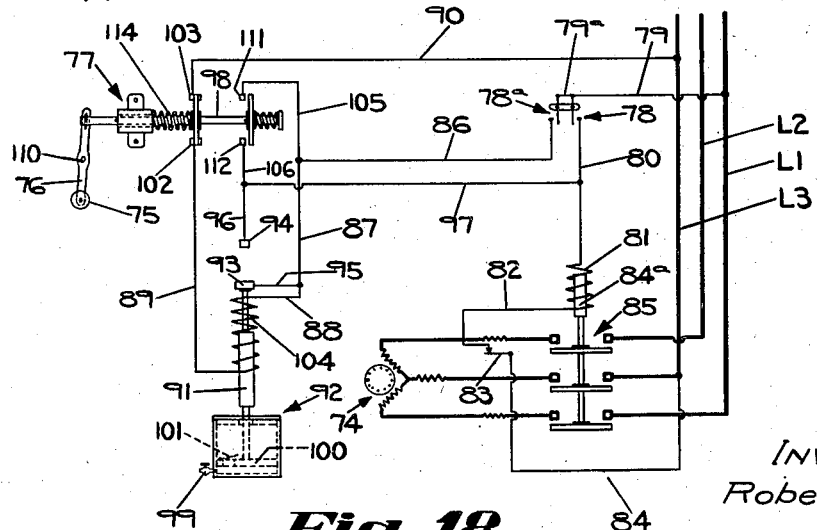
Fig. 18 is a wiring diagram of the control mechanism for operating the apparatus.

As a matter of fact, the rake may be continuously operated, if desired. Fig. 18 illustrates the details of the wiring of the controls for the operating mechanism. It will be seen that the power is taken from a three-phase line indicated on Fig. 18 by conductors $L_1$, $L_2$, $L_3$. For continuously operating the rake, a hand switch is provided which maintains continuous the circuit through the motor, and for the intermittent operation of the rake, a second switch is provided operable simultaneously with, but in opposition to, the first mentioned switch, for controlling certain timing means as will be explained hereafter.

Therefore, when it is desired to continuously operate the rake, the switch, indicated at 78, Fig. 18, is closed, the switch 78a being opened.

Now, when the switch 78 is closed, a circuit will be established from $L_1$ of the main line through conductor 79, thence through the switch 78, conductor 80, magnetic coil 81, conductor 82, thermal safety cut-out 83, conductor 84, to the main line conductor $L_3$. The coil 81 becoming energized, it pulls up the plunger 84a to close the motor control switch 85, thereby establishing a circuit through the motor 74. The motor 74 will thus be operated continuously until the hand switch 78 is opened, and consequently, the rake will be operated continuously.

When periodic operation of the rake is desired, the switch 78a is closed, and the switch 78 is opened. Upon closing the switch 78a, a circuit is established from the main line conductor $L_1$, through conductor 79, conductor 79a, switch 78a, conductor 86, conductor 87, conductor 88, through coil 104, through conductor 89, normally closed contacts 102 and 103, and conductor 90 back to the main line conductor $L_3$. This circuit magnetizes coil 104, pulling up the piston rod 91 of the dash pot 92.

The action of the dash pot is such that a desired time interval will lapse between the energization of the coil 104 and engagement of the contact 93 on the rod 91 with contact 94, which lapse of time is provided for reasons hereinafter apparent. When engagement has been made between contacts 93 and 94, a circuit will be completed from the main line conductor L1, through conductors 79 and 79a, switch 78a, conductor 86, conductor 87, conductor 95, contacts 93 and 94, conductor 96, conductor 97, conductor 80, coil 81, conductor 82, thermal safety cut-out 83, conductor 84, to the main line conductor L3. This circuit energizes the coil 81, thereby closing the motor switch 85 to operate the motor 74.

When motor 74 starts to operate, the rake C is driven, and the operation of the rake continues until it comes into contact with the roller 75 mounted at the end of the limit switch operating lever 76. Engagement of the rake C with roller 75 rocks the lever 76 about its pivot 110, thereby pulling rod 98 against the pressure of the spring 114, thus compressing the spring and opening the normally closed contacts 102 and 103 and closing the contacts 111 and 112. This action is such, however, that contacts 02 and 103 do not open until after contacts 111 and 2 are closed, so that a "holding circuit" is maintained through contacts 11 and 112 and motor 74 so as to assure the rake being operated sufficiently long to pass the roller 75.

Engagement between rake C and roller 75 and consequent operation of the lever 76 trips the limit switch, and opening of the contacts 102 and 103 de-energizes coil 104, allowing the piston 100 of the dash pot to drop. When, due to the action of the holding circuit as above mentioned, the rake C has passed by the roller 75, the spring 114 is released, thereby moving rod 98 in the opposite direction to close the normally closed contacts 102 and 103, thereby again starting the lifting of the dash pot piston 100 and opening contacts 111 and 112 to break the holding circuit, thereby stopping the motor and the rake, these being rendered inoperative until the time required for the plunger rod 91 to be lifted to again close the contacts 93 and 94, the speed of operation of the dash pot being closely controllable by suitably adjusting, as desired, a pet-cock, or the like, 99 which controls the flow of air into the dash pot. Air is permitted to pass through the piston 100 of the dash pot by way of a valve 101 therein, the valve opening as the piston drops, and closing as the piston is raised responsively to energization of coil 104. When the contacts 111 and 112 are closed, a holding circuit is established from main line conductor L1 through conductors 79 and 79a, switch 78a, conductors 86 and 105, contactors 111 and 112, conductors 106, 97 and 80, coil 81, conductor 82, thermal safety cut-out 83, and conductor 84 to the main line conductor L3 to assure the rake passing the lever 76 of the limit switch. Otherwise, the rake might stop in contact with roller 75 and prevent contacts 102 and 103 from closing, thereby holding the timing circuit open, thereby interfering with the automatic operation of the system.

As the roller 75 is freed from the rake, the spring 114 acts to close the normally closed contacts 102 and 103 and open the normally open contacts 111 and and 112, thereby re-establishing the circuit through the timing mechanism which will begin to re-time for the next starting of the conveyor motor 74.

The form of apparatus described up to this point is fixedly secured in the pit or tank. It may be convenient, however, to movably mount the screen and guide tracks relative to the pit or tank to render access to the interior thereof more convenient, and to render the apparatus itself more available for repair or replacement of parts. This modification is illustrated in Figs. 10 to 17, inclusive, in which views parts corresponding to the parts of the apparatus of Figs. 1 to 9 inclusive are designated by like reference characters.

In this modified form, both the screen A and guide tracks B are hingedly mounted at their upper ends so that they may be swung, in a vertical plane, clear of the pit or tank in which the screen is submerged, as indicated by lines 132 and 131, in Fig. 10. The hinged mounting of the tracks B enable them to be raised independently of the screen A, thus affording convenient access to the screen, which, in turn, may then be lifted if desired.

To this end, the supporting framework D' is provided with horizontal braced brackets 115, 115, having bearings 116, 116 thereon, in which bearings are mounted a shaft 117 to which the plate 5 is secured; and, as previously described, the plate 5 is welded to the screen A. The shaft 117 and bearings 116, 116 afford the hinged mounting for the screen A. For supporting the screen A, the bars 1 thereof are notched as indicated at 118, these notches fitting over bars or rods 119 embedded in the concrete of the pit and desirably, for strength, extending from side to side through the pit, transversely of the screen, to support the latter across its entire width; or, if desired, these rods may extend from each side of the pit only sufficiently far to enable the side bars of the screen to rest thereon. As before described, the screen may be provided with one or more transversely extending bars 51 for properly spacing and bracing the bars 1 of the screen. Obviously, the rods 119 and bars 51 must be sufficiently below the path of travel of the rake teeth 45 to enable these teeth to freely clear the bars, so that the path of travel of the rake will be continuously unobstructed. The bars 51 make convenient means enabling suitable hoisting mechanism to be attached to the screen for lifting it. The guides B are notched as indicated at 118', for support on a rod 119', similar to rods 119.

As will be seen very clearly from Fig. 10, the guide tracks B may also be lifted. For this purpose, the upper and lower members 32 and 33 of the tracks are extended behind the shaft 67, and are interconnected by the angle bars 120, 121, to which plates 122, 122, (see Fig. 11, for example) are secured. The plates 122 are provided with elongated slots 123, through which slots the shaft 67 is passed. It will be seen, therefore, that the guide tracks B are hingedly mounted on the shaft 67.

Figure 14:
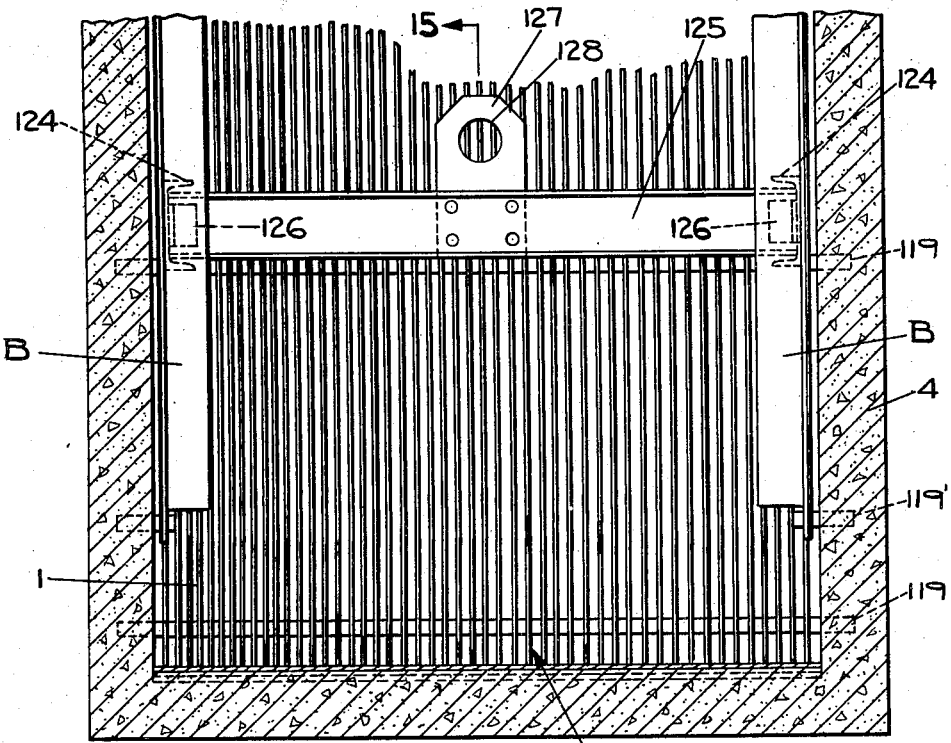
Fig. 14 is a fragmentary elevation of the lower part of the screen and guides for the conveyor chains of the apparatus of Fig. 10, showing a provision of means for lifting the guides.
Figure 15:
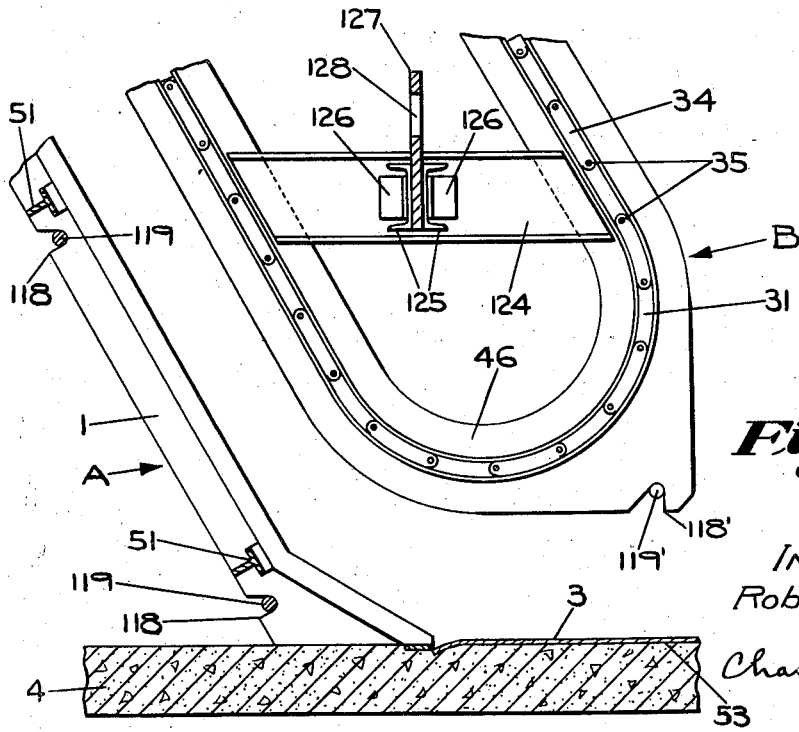
Fig. 15 is a section taken on line 15—15 of Fig. 14.
Figure 16:
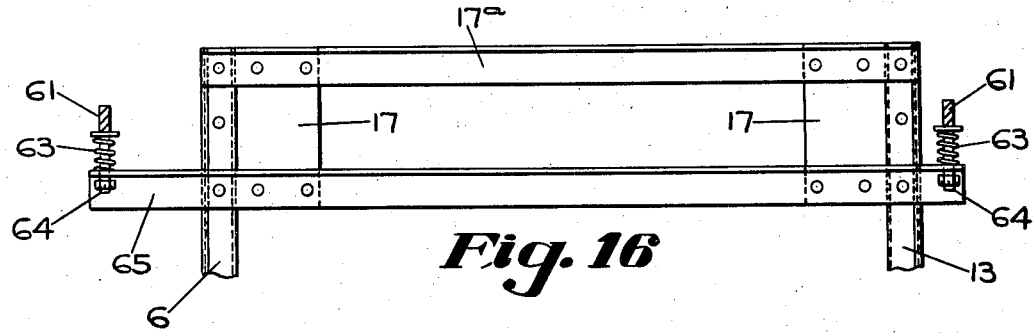
Fig. 16 is a fragmentary sectional view taken on line 16—16 of Fig. 11.

In order to enable the guide tracks B to be lifted conveniently, and to brace the forward and return runs of the conveyor chains, there may be provided the braces illustrated in Figs. 14 and 15, wherein the forward and return runs of the guide tracks are interconnected by brace channels 124, 124 welded to the guide tracks out of the path of travel of the rake. The channels 124, 124 are interconnected by cross-beam 125, 125, braced by brackets 126, 126 welded to channels 124, 124 and to the beam 125. Between this beam 125 is secured a plate 127 having an opening 128 therein to receive a suitable lifting tool; and while the path of travel of the rake is wholly unobstructed, it will be seen that the entire screen structure is rigidly braced.

Because of the complete penetration of the interstices between the screen bars 1 by the teeth 45 of the rake, in both forms of the apparatus, the screen is self-cleaning and the movement of the rake is such that obstructions will be pulled out of the screen instead of being pushed through the screen; this action is facilitated by the hinged mounting of the rake, which hinged mounting also prevents jamming of the mechanism from accumulations of foreign material in the bottom of the channel or upon the screen. However, in the event that some unusual obstruction be encountered by the rake to cause the rake to jam, it is desirable to provide means for releasing the mechanism without damage.

This is accomplished through the provision of one or more shear pins 129 connecting the sprocket 69 with the shaft 67, so that if undue strains are imparted to the mechanism, the pins 129 will shear off, allowing sprocket 69 to freely rotate. These shear pins are of course readily replaceable, and form yieldable connections between the driving sprocket 69 and head shaft 67.

It will be understood, of course, that except for the differences in structure incident to the hinged mounting of the screen and guide tracks in the second form of the apparatus described above, the construction is the same in both forms, both mechanically and electrically, and the operation of the rake is identically the same in both cases.

It will be observed that bars 130 are provided on each upper corner of plate 5, these bars sloping downwardly to prevent too forceful dropping of the rake C when the rake clears plate 5, it being understood that bars 130 are engaged by the rake just before the rake changes its direction of travel.

Referring to Figs. 19, 20 and 21, it will be seen that the screen A is installed in a vertical position, which requires the provision of means for maintaining the rake or scraper C in operative engagement with the bars 1 of the screen. For this purpose, there may be provided a spring 133 adapted to press against each arm 39 of the rake C, the springs 133 being of sufficient strength to overcome the weight of the rake and to maintain a firm engagement between the rake and screen. For mounting the spring, each of the plates 36 is provided with an additional pin 134 around which the spring 133 is twisted, and which forms a fulcrum about which the spring operates. One end of the spring is bent around the pins 47 for anchorage. In this manner, there are provided yieldable mountings for the scraper, which maintain the rake in proper operative engagement with the screen.

The installation represented in Figs. 22 and 23 shows a bucket 135 mounted on the chains 30 in advance of the rake C, for the purpose of removing heavy materials such as sand, cinders, gravel, etc., which may be associated with the incoming sewage. For collecting such materials a sump 136 may be provided at the bottom end of the screen and the bucket 136 is adapted to enter the sump, as shown in Fig. 23 and scrapes out the materials accumulated therein. The bucket 136 is mounted like the rake C. Plates 137 are like plates 36, arms 138 carrying the bucket 135 are like arms 39 carrying the rake, abutment pins 139 correspond to abutment pins 47, and abutment pins 140 correspond to abutment pins 49. The movements of the bucket from operative to inoperative positions and contrarily, are like the corresponding movements of the rake C. The sump 136 is lined with a plate 141 against which plate the bucket 135 scrapes. The bucket 135 enters the material accumulated in the sump from behind the material, and effectively removes it.

In the installations shown in Figs. 19 and 22, the collected materials may be dumped in a hopper 142, communicating with a suitable collecting receptacle 143.

Figure 17:
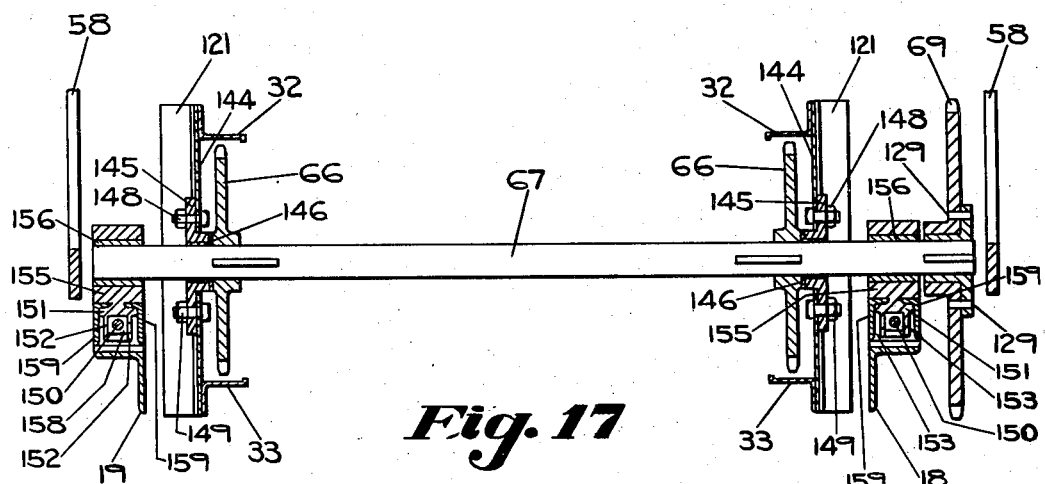
Fig. 17 is a sectional view taken on line 17—17 of Fig. 11.

Referring further to Figs. 11 and 17, it will be seen that the shaft 67 is journalled in plates 144, 144, through bearings 145, 145, these bearings being provided with bushings 146, 146. The plates 144 are also provided with slots 147 in addition to the slots 123, previously referred to, the bearings 145 being secured in these slots by bolts 148, 148, and 149, 149, release of which bolts enables the shaft 67 to be moved along the slots 123, thus forming a slack take-up for the chains 30. The mechanism for moving the shaft comprises the screws 150, 150, passing through bearings 151, 151, provided with lugs 152, 152, and 153, 153, between which lugs are positioned nuts 158, 158, threaded on the screws 150. These screws are supported in angle bearings 157, 157, on the beams 18 and 19. The members 151 are parts of the trunnion take-up bearings 155, 155. Adjustment of each screw by the respective head 154 causes relative travel of the nuts 158, producing corresponding movement of the bearings 155, 155, which bearings are located adjacent the ends of the shaft 67. These bearings may be provided with bushings 156, 156, in which the shaft rotates. The shaft 67 may therefore be adjusted for the length of the slots 123, for taking up slack in the chains 30, and may be secured in position by tightening the bolts 148, angles 159 on the angle beams 19 and 18, respectively, form guide tracks along which the take-up bearings 155 move. Nuts 160 are provided at the end of the screws 150 to prevent displacement of the screws, the nuts being held against rotation by suitable means, such as a cotter-pin, not shown. The construction of this take-up bearing is substantially similar to that shown in the United States Patent No. 1,837,260, granted December 22, 1931, to Earle V. Francis.

In Figs. 1 and 3, it will be noted that there is provided a sprocket 161 mounted on shaft 162 for the purpose of tightening the chain 70, while in Figs. 19 and 22, a somewhat different form of take-up is shown. In these last-mentioned views, the upright standards 163, of which there are two, but only one shown on the drawings, are provided with a telescoping end section 164 provided with slots 165, 165, through each of which extends a limit pin 166 and 167, respectively. A sprocket 168 engages chain 70, the sprocket 168 operating on shaft 169. Adjustment of section 164 obviously correspondingly adjusts the tautness of chain 70. It will be understood that this construction is duplicated at the other side of the apparatus.

Obviously those skilled in the art may make various changes in the details and arrangement of parts without departing from the spirit and scope of the invention as defined by the claims hereto appended, and I wish therefore not to be restricted to the precise construction herein disclosed.

Having thus described and shown an embodiment of my invention, what I desire to secure by Letters Patent of the United States is:

1. A screening apparatus comprising the combination with a screen portion, of a rake or scraper adapted to pass over the screen, a bucket operating over the screen in advance of the rake, mechanism for moving the rake and bucket along the screen, and hinged mountings for the rake and bucket for enabling the rake and bucket to assume operative positions upon passing a predetermined position relative to the screen, the said bucket being adapted to enter a sump adjacent the bottom of the screen and to collect therefrom granular material collected in the sump.

2. In a liquid screening apparatus, the combination with a screen adapted to extend into a refuse laden stream to catch the refuse thereof, of a pair of endless draft means positioned adjacent the edges of said screen adjacent the upstream side thereof, spaced stop means on each of said draft means, a pivoted rake carried between said draft means and adapted to move pivotally between said stops, said rake resting against one of said stops during the downward travel of said rake and being adapted to move from said stop toward the other stop as said rake approaches its lowermost position, and means for lifting said rake from said first mentioned stop as said rake approaches said lowermost position.

3. In a liquid screening apparatus, the combination with a screen adapted to extend into a refuse laden stream to catch the refuse thereof, of guide means adjacent the upstream side of said screen comprising a pair of U-shaped guide tracks, a pivoted rake adapted to pivot about its axis at is passes around the bottom of said guide tracks, means adapted to move said rake along said guide tracks and across said screen, stop means for supporting said rake above its pivot during downward travel thereof, and cam means adapted to lift said rake away from said stop means as said rake approaches the bottom of said guide tracks.

4. In a liquid screening apparatus, the combination with a screen adapted to extend into a refuse laden stream to catch the refuse thereof, of guide means adjacent the upstream side of said screen comprising a pair of U-shaped guide tracks, a pivoted rake adapted to pivot about its axis as it passes around the bottom of said guide tracks, means adapted to move said rake along said guide tracks and across said screen, stop means for supporting said rake above its pivot during downward travel thereof, and cam means adapted to lift said rake away from said stop means as said rake approches the bottom of said guide tracks said cam means being carried by said guide means.

5. In a liquid screening apparatus, the combination with a screen adapted to extend into a refuse laden stream to catch the refuse thereof, of draft means adjacent the upstream side of said screen and adjacent the side thereof, said means being arcuate adjacent the bottom of the screen, a pivoted rake carried by said draft means, stop lugs carried by at least one of said draft means between which said rake can pivot, said rake being adapted to rest on one of said stop lugs during the first part of its downward travel and against another of said lugs during the last part thereof, and cam means adapted to move said rake from said first mentioned stop lug toward the other stop lug as the rake approaches the bottom of its travel.

6. In a liquid screening apparatus, the combination with a screen adapted to extend into a refuse laden stream to catch the refuse thereof, of guide means adjacent the upstream side of said screen and adjacent the sides thereof, said means being arcuate adjacent the bottom thereof, a pivoted rake extending between said guide means, draft means for moving said rake with respect to said guide means and across said screen, a pair of stops between which said rake is pivotally movable, said rake resting on one of said stops during the first part of its downward movement and against the other of said stops during the last part thereof, and cam means carried on said guide means adapted to move said rake from said first mentioned stop toward said second mentioned stop as the rake approaches the bottom of said guide means.

7. In a liquid screening apparatus, the combination with a screen adapted to extend into a refuse laden stream to catch the refuse thereof, of a pair of U-shaped guide tracks adjacent the upstream side of said screen and positioned one adjacent each edge thereof, said guide means comprising substantially parallel side walls, endless draft means carried by said guide means between said side wall, means for driving said draft means, oppositely positioned plates carried by said draft means, at least one of said plates carrying a pair of stop lugs, a rake pivotally connected to said plates and adapted for pivotal movement between said stop lugs, said rake normally resting on one of said lugs during its downward travel, and cam means carried by said guide means adapted to move said rake from said one stop lug toward said other stop lug as said rake approaches the lower end of said guide means.

8. In a liquid screening apparatus, the combination with a screen adapted to extend into a refuse laden stream to catch the refuse thereof, of a pair of U-shaped guide tracks adjacent the upstream side of said screen and positioned one adjacent each edge thereof, said guide means comprising substantially parallel side walls, endless draft means carried by said guide means between said side wall, means for driving said draft means, oppositely positioned plates carried by said draft means, at least one of said plates carrying a pair of stop lugs, a rake pivotally connected to said plates and adapted for pivotal movement between said stop lugs, said rake normally resting on one of said lugs during its downward travel, and cam means adapted to move said rake from said one stop lug toward said other stop lug as said rake approaches the lower end of said guide means.

9. In a liquid screening apparatus, the combination with a stationary screen adapted to extend into a refuse laden stream and to catch the refuse thereof, of a rake to clean said screen, a pair of endless draft chains mounted on sprockets above said screen and extending into said stream along the edges of said screen, stationary U-shaped means adjacent the lower part of said screen providing the sole lower guide and supporting means defining the lower track of said chains, means attaching the ends of said rake to said chains, and means for driving said chains.

10. A chain guide track for a sewage screening apparatus comprising a pair of parallel plates attached together to form a track and bent into a distorted U-shaped configuration, the legs of said U being substantially straight adjacent the intermediate portion of said U and being arcuate adjacent the top thereof, and a rake lifting cam carried by said guide track.

11. A guide track for a sewage screening apparatus chain comprising a pair of parallel plates attached together to form a track and bent into a U-shaped configuration and flanges on said plates capable of retaining a chain therebetween.

12. In a liquid screening apparatus, the combination with a frame, of a screen pivotally mounted to said frame and adapted to extend into a refuse laden stream to catch the refuse thereof and to be lifted therefrom, a rake adapted to move across said screen, guiding and supporting means for said rake pivoted to said frame and adapted to extend into said stream and to be lifted therefrom, said guiding and supporting means being pivotally movable with respect to said frame independently of the pivotal movement of said screen.

13. In a liquid screening apparatus, the combination with a frame, of a screen pivotally mounted to said frame and adapted to be extended into a refuse laden stream to catch the refuse thereof and to be lifted therefrom, a rake adapted to move across said screen, guiding and supporting means for said rake, said means being mounted for pivotal movement independent of the pivotal movement of said screen.

14. In a screening apparatus, the combination with a screen adapted to extend into a refuse laden stream and to catch large particles of material therein, of a rake adapted to travel over said screen on the upstream side thereof and to clean it of caught material particles, mechanism for guiding said rake downwardly into said stream out of operative relation with respect to said screen and for drawing said rake upwardly through said stream in operative relation with respect to said screen to clean it as aforesaid, said means comprising endless power driven draft chains extending into said stream on the upstream side of said screen and to a position near the bottom of said screen, guiding and supporting means for said endless chains which are also within said stream, said rake being pivoted to said endless draft chains, and means within the stream for transferring said rake gradually from its inoperative relation with respect to said screen to its operative relation with respect thereto, thereby preventing any excess jarring incident to said transfer.

15. In a screening apparatus, the combination with a screen adapted to extend into a refuse laden stream and to catch large particles of material therein, of guide means positioned on the upstream side of said screen and defining a relatively large radius curve adjacent the screen bottom, endless draft chains on said guide means, a pivoted rake carried by said chains and adapted to be moved downwardly into said stream out of operative relation with said screen and to be drawn upwardly out of said stream and in operative relation therewith to clean it of caught material, said rake having means for attaching it to said chains whereby it will be substantially upright and at a position upstream of the position of attachment to said chains when at its lowest position, and a wearing plate at the bottom of said screen and extending upstream thereof over which said uprightly positioned rake will travel in contact therewith as it starts a cleaning operation, thereby insuring a thorough cleaning of the screen for each operation of the rake.

16. In a screening apparatus, the combination with a stationary bar screen adapted to extend into a refuse laden stream and to catch large particles of material therein, of a rake adapted to travel over said screen on the upstream side thereof with its teeth interleaving the bars of said screen to clean it of caught material particles, mechanism for guiding said rake downwardly into said stream out of operative relation with respect to said screen and for drawing said rake upwardly through said stream in operative relation with respect to said screen to clean it as aforesaid, said mechanism comprising endless power driven draft chains extending into said stream on the upstream side of said screen and to a position near the bottom of said screen and over drive sprockets outside said stream, guiding the supporting means for said endless chains comprising stationary U-shaped side guides the bottom of which extend into said stream and the tops of which extend out of said stream and terminate adjacent the drive sprockets, said U-shaped side guides comprising U-shaped plates to which are attached parallel plates between which said draft chains run, said parallel plates having inwardly extending chain retaining flanges to maintain said chains in place as aforesaid, said guiding and supporting means comprising the sole guiding and supporting means for said chains while within said stream, whereby there is a complete absence of rotating guiding or supporting means for said chains within said stream.

17. In a liquid screening apparatus, the combination with a stationary screen adapted to extend into a stream, of a rake operable to clean said screen, a pair of endless draft chains mounted on sprockets above said screen and extending into said stream along the edges of said screen, stationary U-shaped means adjacent the lower part of said screen providing the sole lower guide and supporting means defining the lower track of said chains, links of said chains having direct sliding contact with said U-shaped means, means attaching said rake to said chains, and means for driving said chains to move said rake over said screen.

18. In a liquid screening apparatus, the combination with a stationary screen adapted to extend into a stream, of a rake to clean said screen, a pair of endless draft chains for said rake mounted on sprockets above said screen and extending into said stream along the edges of said screen, the sole lower guide means for said draft chains comprising a pair of U-shaped guide tracks having arcuate bottoms, one for each of said chains, each guide track comprising a pair of connected parallel continuous U-shaped spaced plates between which a chain is adapted to move in direct sliding contact with at least one of said plates, the arcuate bottoms of said guide tracks being positioned adjacent the bottom of said screen and the tops thereof being adjacent said sprockets, means connecting said rake to said chains, and means for driving said sprockets.

19. In a screening apparatus, the combination with a stationary screen adapted to extend into a sewage stream to catch particles of material therein, of means adapted to travel over said screen and clean it of caught material, endless draft chains to which the cleaning means is attached and positioned near said screen and adapted to extend into said stream at one end and to guide said cleaning means across the surface of said screen and out of said stream, sprockets positioned outside said stream over which said chains travel, means for driving said sprockets, and non-rotary guiding and supporting means positioned within said stream and comprising the sole guiding and supporting means for said draft chains as they change their direction of travel within said stream, links of said chains making direct sliding contact with said guiding and supporting means during operation.

20. In a liquid screening apparatus, the combination with a stationary screen adapted to extend into a fluid stream, of means for cleaning said screen, a pair of endless draft chains attached to operate said cleaning means, means for driving said draft chains, and means for guiding, protecting and supporting said chains while restricting them to a predetermined path comprising U-shaped guides extending into said fluid stream, each of said guides comprising a pair of parallel plates connected together at one side and having retaining means at the other side, whereby the chains will be entirely enclosed while in the stream except for one side, and will be retained in proper place without requiring any members to extend between the chains and across the screen.

21. In a liquid screening apparatus, the combination with a stationary screen adapted to extend into a stream, a rake, means for moving said rake over said screen comprising a pair of spaced endless chains; guiding, supporting and protecting means for said chains comprising U-shaped members adjacent the sides of said screen, each formed by a pair of continuous U-shaped parallel plates between which the links of said chain travel, a plate rigidly connecting said parallel plates at one side, and flanges extending toward each other from the other side of said plates and operating to retain a chain in proper place as aforesaid, whereby the approach to said screen is unobstructed, except for said rake.

ROBERT E. BRIGGS.